United States Patent
Schow et al.

(10) Patent No.: US 9,698,529 B1
(45) Date of Patent: Jul. 4, 2017

(54) CABLE HOLDER FOR SYSTEM SERVICEABILTY

(71) Applicant: Amazon Technologies, Inc., Reno, NV (US)

(72) Inventors: Kenneth Michael Schow, Seattle, WA (US); Peter George Ross, Olympia, WA (US)

(73) Assignee: Amazon Technologies, Inc., Reno, NV (US)

( * ) Notice: Subject to any disclaimer, the term of this patent is extended or adjusted under 35 U.S.C. 154(b) by 365 days.

(21) Appl. No.: 13/780,495

(22) Filed: Feb. 28, 2013

(51) Int. Cl.
| H01R 13/635 | (2006.01) |
| H01R 13/627 | (2006.01) |
| F16L 3/223 | (2006.01) |
| H01R 13/60 | (2006.01) |
| H01R 13/518 | (2006.01) |
| H01R 13/629 | (2006.01) |
| H02G 3/32 | (2006.01) |

(52) U.S. Cl.
CPC ............ *H01R 13/635* (2013.01); *F16L 3/223* (2013.01); *H01R 13/518* (2013.01); *H01R 13/60* (2013.01); *H01R 13/6271* (2013.01); *H01R 13/6272* (2013.01); *H01R 13/62922* (2013.01); *H01R 13/62944* (2013.01); *H01R 13/62955* (2013.01); *H01R 13/62966* (2013.01); *H02G 3/32* (2013.01)

(58) Field of Classification Search
CPC ............ H01R 13/518; H01R 13/62944; H01R 13/635; H01R 13/62966; H01R 13/60; H01R 13/6272; H01R 13/6271; H01R 2201/04; H01R 13/62955; H01R 13/633; H01R 13/627; H02G 3/32; F16L 3/223

USPC .............. 439/540.1, 352, 355, 368, 372
See application file for complete search history.

(56) References Cited

U.S. PATENT DOCUMENTS

| D190,429 S | * | 5/1961 | Hoagland ..................... D6/552 |
| 3,781,761 A | * | 12/1973 | Harwood ..................... 439/369 |
| 3,894,706 A | * | 7/1975 | Mizusawa ..................... 248/68.1 |
| 4,971,271 A | * | 11/1990 | Sularz ..................... 248/68.1 |
| 5,224,186 A | * | 6/1993 | Kishimoto et al. ..................... 385/78 |
| 5,316,246 A | * | 5/1994 | Scott et al. ..................... 248/68.1 |
| 5,324,210 A | * | 6/1994 | Brickley ............ H01R 13/6392 439/347 |
| 5,422,436 A | * | 6/1995 | Zachrai ..................... 174/666 |
| 5,535,969 A | * | 7/1996 | Duffy, Jr. .............. F16L 3/227 24/487 |
| 5,566,269 A | * | 10/1996 | Eberle et al. ..................... 385/137 |
| 5,579,425 A | * | 11/1996 | Lampert ............. G02B 6/3869 385/55 |
| D378,408 S | * | 3/1997 | Pyeatt et al. ..................... D24/128 |
| 5,862,291 A | * | 1/1999 | Stockman et al. ............. 385/136 |
| 6,012,940 A | * | 1/2000 | Wheeler ..................... 439/369 |
| 6,106,328 A | | 8/2000 | 'Neal |

(Continued)

OTHER PUBLICATIONS

White Paper, "Data Center Top-of-Rack Architecture Design," 2009 Cisco Systems, Inc., pp. 1-13.

*Primary Examiner* — Eret McNichols
(74) *Attorney, Agent, or Firm* — Robert C. Kowert; Meyertons, Hood, Kivlin, Kowert & Goetzel, P.C.

(57) ABSTRACT

A cable holder includes a holder body and cable-holding portions that couple with one or more cables. The cable-holding portions hold portions of two or more cables in a predetermined spacing and arrangement with respect to one another.

17 Claims, 7 Drawing Sheets

(56) References Cited

U.S. PATENT DOCUMENTS

| | | | |
|---|---|---|---|
| 6,109,978 A * | 8/2000 | Stellman | H01R 13/514 439/484 |
| 6,123,564 A * | 9/2000 | Belmore, III | 439/344 |
| 6,146,179 A * | 11/2000 | Denny | H01R 13/6335 439/350 |
| 6,332,798 B1 * | 12/2001 | Farooq | 439/352 |
| 6,461,052 B1 * | 10/2002 | Hines | G02B 6/3887 385/135 |
| 6,528,728 B1 * | 3/2003 | Shima | H02G 3/0437 174/101 |
| 6,547,585 B2 * | 4/2003 | Bradley | H01R 13/633 439/353 |
| 6,672,898 B2 * | 1/2004 | Kahle | G02B 6/3879 385/55 |
| 6,771,871 B2 * | 8/2004 | Krampotich | G02B 6/4471 385/134 |
| 6,796,844 B1 * | 9/2004 | Edwards, III | 439/638 |
| 6,801,704 B1 * | 10/2004 | Daoud | G02B 6/4471 385/134 |
| 6,857,900 B2 * | 2/2005 | Kleeberger et al. | 439/540.1 |
| 7,140,911 B1 * | 11/2006 | Rector et al. | 439/540.1 |
| 7,273,383 B1 | 9/2007 | Bennett | |
| 7,394,963 B2 * | 7/2008 | Hartlef | 385/136 |
| 7,418,186 B1 * | 8/2008 | Grubish et al. | 385/137 |
| D587,102 S * | 2/2009 | Morgan | D8/356 |
| D601,879 S * | 10/2009 | Kim et al. | D8/356 |
| 7,619,164 B2 * | 11/2009 | Caveney et al. | 174/99 R |
| 7,677,913 B1 * | 3/2010 | Yang | H01R 13/6275 439/358 |
| 7,695,198 B1 * | 4/2010 | Baechtle | G02B 6/3807 385/55 |
| 7,734,139 B2 * | 6/2010 | Rector, III | 385/136 |
| 7,901,237 B2 * | 3/2011 | Abe | H01R 43/26 439/354 |
| D640,527 S * | 6/2011 | Hoek | D8/356 |
| 7,988,485 B2 * | 8/2011 | Zhang | H01R 13/639 439/372 |
| 8,152,385 B2 * | 4/2012 | de Jong | G02B 6/3879 385/53 |
| 8,262,035 B2 * | 9/2012 | Bleus et al. | 248/68.1 |
| 8,287,191 B2 * | 10/2012 | Nielson | G02B 6/406 385/69 |
| 8,290,330 B2 * | 10/2012 | Taylor et al. | 385/135 |
| 8,452,151 B2 * | 5/2013 | Schroeder et al. | 385/137 |
| 8,500,465 B1 * | 8/2013 | Ross et al. | 439/79 |
| 8,814,445 B2 * | 8/2014 | Gallegos et al. | 385/89 |
| 8,998,151 B2 * | 4/2015 | Hoek | 248/68.1 |
| 9,063,303 B2 * | 6/2015 | Irwin | G02B 6/3879 |
| 9,069,149 B2 * | 6/2015 | Yu | G02B 6/3898 |
| 2002/0137392 A1 * | 9/2002 | Wainio | H01R 13/5804 439/623 |
| 2003/0025048 A1 * | 2/2003 | Knotts | 248/68.1 |
| 2004/0118982 A1 * | 6/2004 | Shillings et al. | 248/68.1 |
| 2005/0189453 A1 * | 9/2005 | DeGuevara | 248/68.1 |
| 2007/0020994 A1 * | 1/2007 | Alvarez | 439/540.1 |
| 2008/0096438 A1 * | 4/2008 | Clark et al. | 439/713 |
| 2008/0242144 A1 * | 10/2008 | Dietz | 439/540.1 |
| 2008/0311781 A1 * | 12/2008 | Wojcik et al. | 439/352 |
| 2009/0065249 A1 * | 3/2009 | Silvers | 174/72 A |
| 2009/0227138 A1 | 9/2009 | Lv et al. | |
| 2010/0132979 A1 * | 6/2010 | Chen | 174/135 |
| 2010/0258685 A1 * | 10/2010 | Gardner et al. | 248/68.1 |
| 2010/0267251 A1 * | 10/2010 | Phu | 439/49 |
| 2011/0115494 A1 * | 5/2011 | Taylor et al. | 324/537 |
| 2011/0312203 A1 * | 12/2011 | Liu et al. | 439/345 |
| 2013/0309914 A1 | 11/2013 | Le Cozic et al. | |
| 2014/0159289 A1 * | 6/2014 | Loewe et al. | 267/140.11 |
| 2015/0056832 A1 * | 2/2015 | Fransen et al. | 439/153 |
| 2015/0089774 A1 * | 4/2015 | Kalejaiye | 24/122.3 |

* cited by examiner

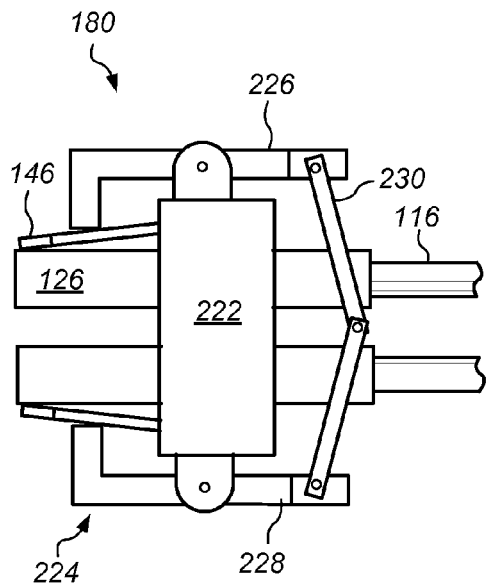
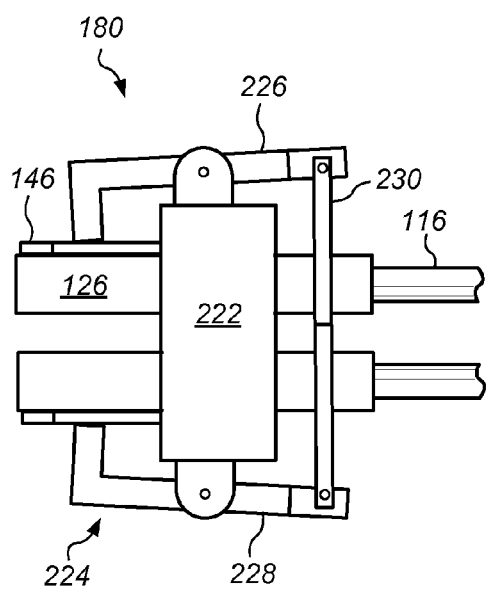
FIG. 10A
FIG. 10B
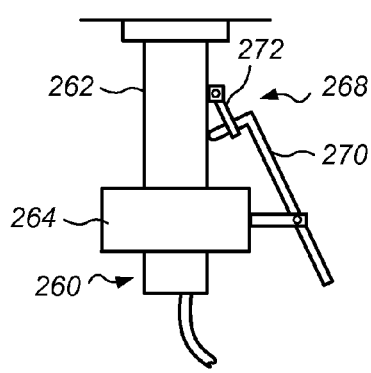
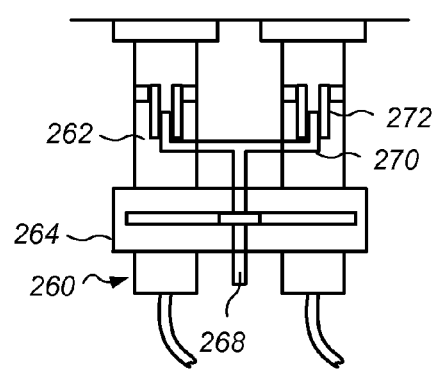
FIG. 11A
FIG. 11B

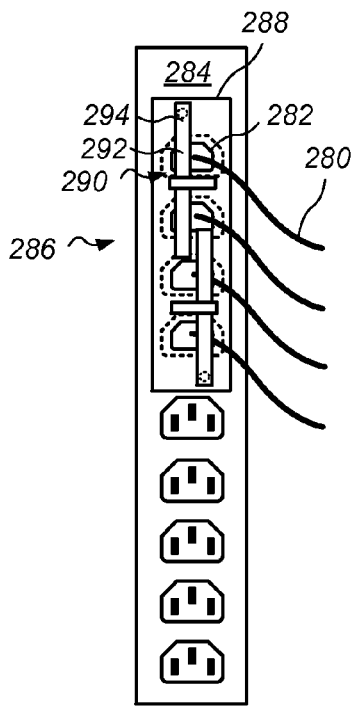
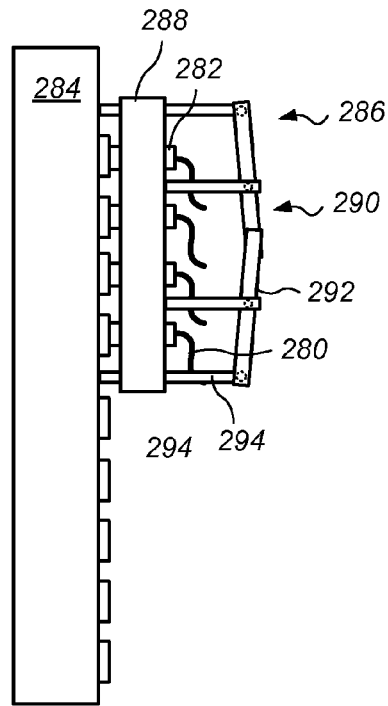
FIG. 12A   FIG. 12B
Couple cable holder to cables such that the cable holder maintains the cables in a predetermined spacing and arrangement with respect to one another
300
↓
Couple connector plugs to corresponding connector receptacles on an electrical device while the cable holder is coupled to the cables
302
FIG. 13

US 9,698,529 B1

CABLE HOLDER FOR SYSTEM SERVICEABILTY

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers.

In data centers, a significant number of network connections may be required in each server rack. Each rack in a data center may, for example, include a top-of-rack switch that has a receptacle panel for plugging in numerous network connector plugs (for example, 24 network or 48 receptacles). If the top of rack switch needs to be removed and serviced or replaced, service personnel may have to go through a time-consuming and laborious process of disconnecting each of numerous connections so that the switch can be removed, and then, after the switch is removed, go through another time-consuming and laborious process of reconnecting each of the connector cable plugs to the switch. In many cases, cable plugs to be reinstalled are out of order. Also, because of the number of connections, there is the possibility that an error may be made during the reconnection process. For example, service personnel may incorrectly switch two of the plugs, with the result that some of the plugs are installed in the wrong receptacles.

BRIEF DESCRIPTION OF THE DRAWINGS

FIGS. 10A and 10B are side views illustrating operation of a release bar of a cable holder that can be operated to release connector plugs from two rows of receptacles of an electrical device.

FIG. 11A illustrates a side view of one embodiment of a cable holder for a set of fiber optic cables. FIG. 11B illustrates a top view of one embodiment of a cable holder for a set of fiber optic cables.

FIG. 12A illustrates a front view of one embodiment of a cable holder for a set of power cables installed in a rack power distribution unit. FIG. 12B illustrates a side view of a cable holder for a set of power cables installed in a rack power distribution unit.

FIG. 13 illustrates one embodiment of managing connections to an electrical device using a cable holder that groups multiple connector plugs.

Figure 1:
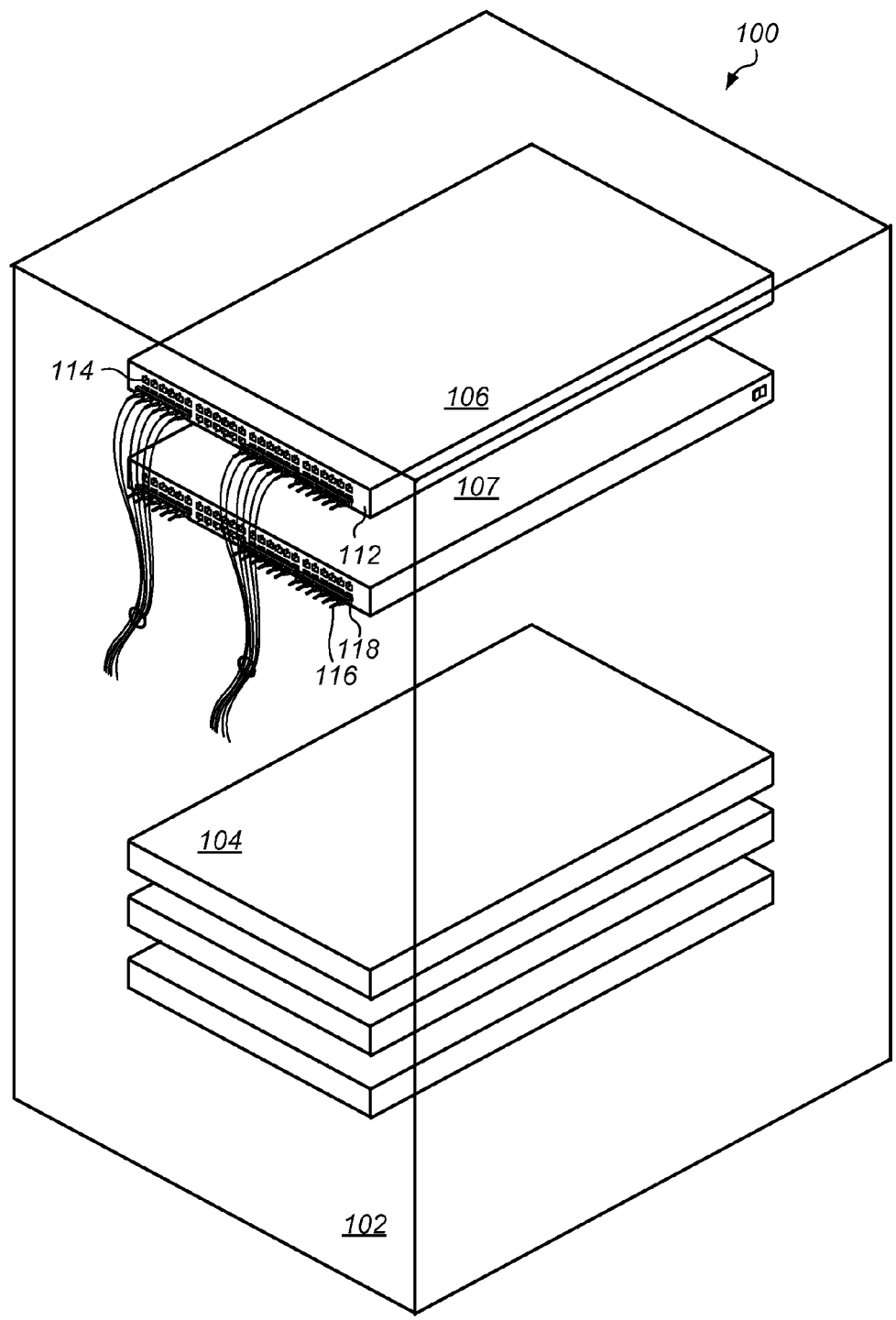
FIG. 1 illustrates one embodiment of a rack including cable holders for groups of connections to a network switch.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for systems and methods for managing cable connections are described. According to one embodiment, a system includes a rack, one or more electrical devices (such as a network switch) coupled to the rack, one or more cables, and one or more cable holders coupled to the cables. The electrical devices may include an enclosure and connector receptacles on the enclosure. The cables include connector plugs. The connector plugs couple with corresponding connector receptacles on the enclosure. The cable holders include cable-holding portions that hold portions of the cables in a predetermined spacing from one another.

According to one embodiment, a cable holder includes a holder body and cable-holding portions that couple with one or more cables. The cable-holding portions hold portions of two or more cables in a predetermined spacing and arrangement with respect to one another.

According to one embodiment, a method of managing connections to an electrical device includes coupling a cable holder with one or more cables such that the cable holder maintains two or more of the cables in a predetermined spacing and arrangement with respect to one another. The predetermined spacing and arrangement matches a spacing and arrangement on a corresponding set of two or more connector receptacles on an electrical device (such as a network switch). The connector plugs are coupled to corresponding connector receptacles on the electrical device while the cable holder is coupled to the cables.

As used herein, a "cable" includes any cable, conduit, or line that carries one or more conductors and that is flexible over at least a portion of its length. A cable may include a connector portion, such as a plug, at one or more of its ends.

As used herein, "holder" means any element or combination of elements that holds another element or elements. Examples of holders include a clamp, a clip, or a clasp.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to devices including a processor, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, a "plug" of a connector means any element or device on a cable that can be used to electrically or optically connect the cable with another device or element.

As used herein, a "release element" means an element, or combination thereof, that can be operated (for example, actuated, turned, pushed, or pulled) to release a device or component. For example, a connector plug may include a release tab that is depressed to unlatch the connector plug from a receptacle in which it is installed.

In some embodiments, a soft clamp conforms around cables at or near a connection of the cables to a receptacle panel of an electrical device, such as a network switch. Service personnel may unplug bunches of cables at a time and keep them captive within the group, labeled, and in order for replacement. In some embodiments, a cable holder is installed by a rack integrator to maximize the serviceability of in-bound racks to a data center.

In some embodiments, a cable holder holds cables connected to an electrical device. The cable holder can hold connector plugs on the cable in an arrangement that matches the order, spacing, and arrangement of mating connector receptacles on the electrical device.

FIG. 1 illustrates one embodiment of a rack including cable holders for groups of connections to a network switch. Computing system 100 includes rack 102, servers 104, network switch 106, and console switch 107. Network switch 106 and console switch 107 are installed at the top of rack 102. Network switch 106 may serve as a top-of-rack switch for computing system 102. Computing system 100 may be one of many rack-mounted computing systems in a data center.

Network switch 106 and console switch 107 each include enclosure 110 and front panel 112. Front panel 112 includes receptacles 114. Examples of connections that may be included on network switch include RJ45 connectors, SFP optical connectors, and direct connector copper connectors.

Computing system 100 includes cables 116. Cables 116 may connect network switch 106 and console switch 107 with servers 104, with systems external to rack 102, or both. In some embodiments, connector plugs on each of cables 116 is labeled with an identifier. Service personnel can use the identifier to match the cable with the correct receptacle 114 on front panel 112 of network switch 106 and console switch 107.

Cable holders 118 are installed on cables 116. In some embodiments, cable holders are installed on cables in a rack before the rack has been placed into service. In other embodiments, cable holders are installed on cables in a rack after the rack has been placed into service. For example, cable holders 118 may be installed on network switch 106 before network switch 106 is to be removed for repair or replacement.

In the embodiment shown in FIG. 1, each of cable holders 118 groups and arranges six of cables 116 to be installed on network switch 106 or console switch 107. A cable holder 118 may nevertheless in various embodiments group and spatially arrange any number of cables. For example, a cable holder may arrange two cables, 8 cables, or 12 cables.

The number of cables grouped on a cable holder may vary from embodiment to embodiment. For example, there may be four groups of eight for optical switches, or there may be straight 24 or 48 port options. The top and bottom of each cable section may be labeled to match a corresponding port on the switch.

In some embodiments, a foam or other pliable material based holder (for example, a clamp) fits under or over the cables that are plugged into a switch. The clamp may be installed just outside of the actual connector to allow removal access and keep the cables captive in groups.

Figure 2:
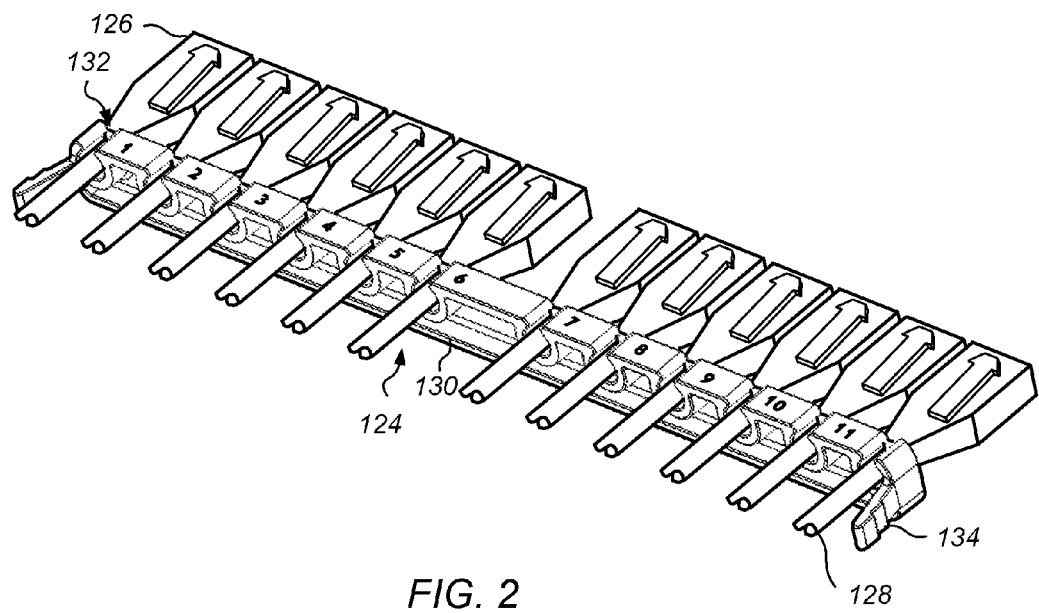
FIG. 2 illustrates one embodiment of a cable holder for a group of cables.

FIG. 2 illustrates one embodiment of a cable holder for a group of cables. Cable holder 124 holds cables 116. Each of cables 116 includes connector plug 126 and cable jacket 128. In the embodiment shown in FIG. 2, connector plug 126 is represented as a RJ45-type connector plug. A cable holder may, however, hold cables terminating in other types of connector plugs.

Cable holder 124 includes cable holder body 130, slots 132, connector removal tabs 134, and labels 136. Cable holder 124 may be made of a pliable material, such as foam or rubber. Cable jacket 128 of cable 116 may press or snap into slots 132 on cable holder 124.

As is illustrated in FIG. 2, a cable holder may be connected to a cable such that a gap exists between the cable holder and the connector plugs. A gap between the connector plugs and the cable holder may allow some freedom in the position of the connector plugs relative to one another. Freedom of movement of cable connector plugs may allow for some adjustment to accommodate variations in spacing on a receptacle panel in which the connector plugs are to be installed. In some embodiments, the position of the cable holder can be adjusted relative to the connector plugs. For example, the cable holder may slide up and down on the cable jacket to increase or decrease the spacing between the connector plug and the cable holder. In certain embodiments, a cable holder may be in contact with a strain relief of a connector plug.

In the embodiment shown in FIG. 2, cable holder 124 has an open top. Cables may be held in place in cable 124 by the resilient characteristics of slots 130. A cable holder may, nevertheless, in some embodiments include a cover or other retaining members. In one embodiment, a cable holder includes a pair of opposing clamping members (for example, top and bottom) that form a clamshell for the cables to be held in.

Figure 3:
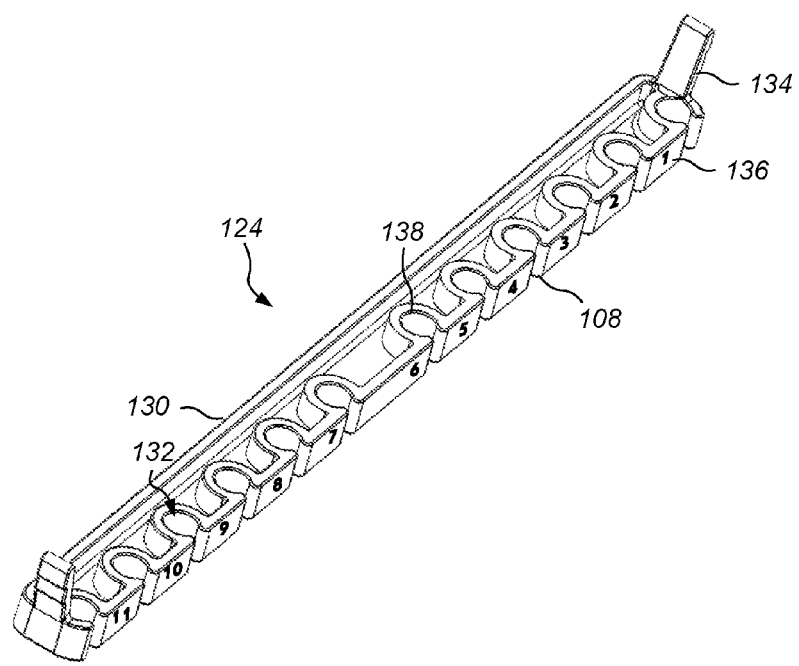
FIG. 3 illustrates one embodiment of cable holder that includes slots for receiving cables.

FIG. 3 illustrates one embodiment of cable holder that includes slots for receiving cables. Cable holder 124 includes cable holder body 130, cable slots 132, connector removal tabs 134, and labels 136. In some embodiments, slots of a cable holder include a detent mechanism that inhibits separation of a cable to a holder, such as detent mechanism 108 shown in FIG. 3. In the embodiment shown in FIG. 2, cable slots 132 include seats 138. The edge of seat 138 of slot 132 is greater than a half circle. Accordingly, once cables 116 are pressed into slots 132, seats 138 may inhibit separation of cables 116 from slots 132.

Labels 136 may be used to identify the position of the cable in the cable holder. In some embodiments, labels 136 may be used to match cable connector plugs to a corresponding receptacle in a panel (for example, the slot for cable 16 may be marked with the number 16, the slot for cable 17 may be marked with the number 17, and so on.) In some embodiments, cables are placed in numbered slots so that they are in an order corresponding to the receptacles in a panel of an electrical device.

Figure 4:
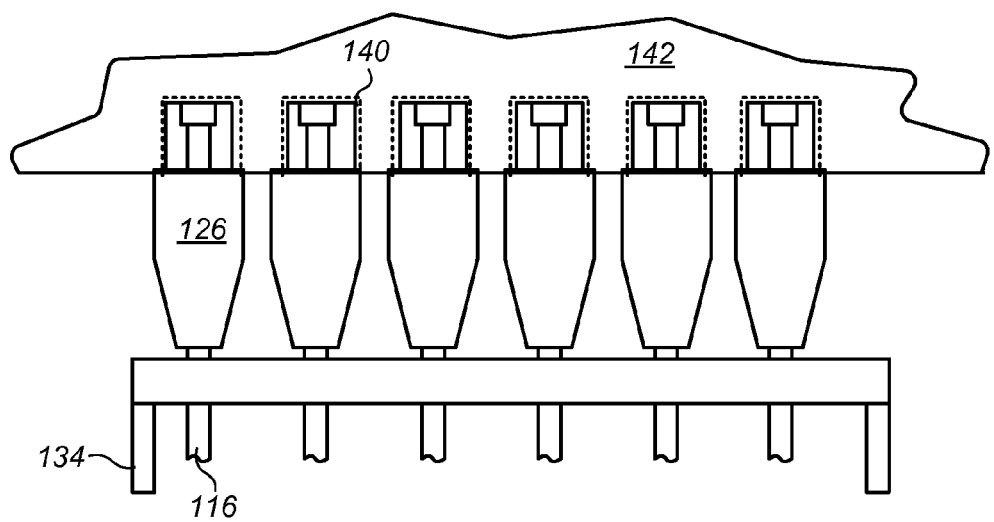
FIG. 4 is a top view illustrating a set of connector plugs installed in a receptacle panel of an electrical device.

In some embodiments, a cable holder is flexible so that the cable holder can be used to sequentially disconnect and withdraw connector plugs on the cable holder. FIG. 4 is a top view illustrating a set of connector plugs installed in a receptacle panel of an electrical device. In FIG. 4, all of connector plugs 126 are fully installed in receptacles 140 of electrical device 142.

Figure 5:
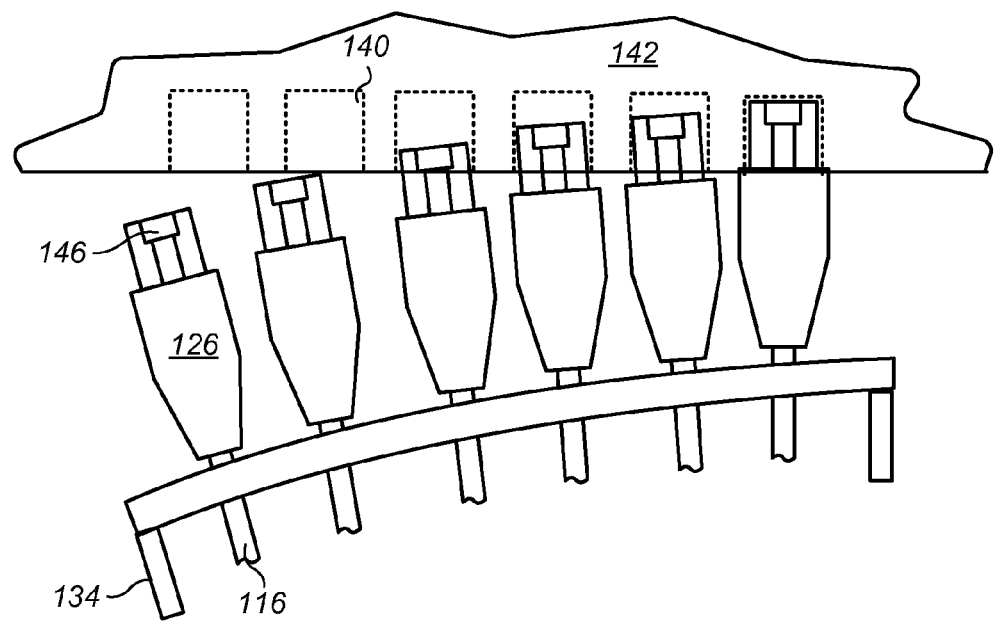
FIG. 5 is a top view illustrating one embodiment of a cable holder that has been used to pull some of the connector plugs in a group of cables away from a receptacle panel.

FIG. 5 is a top view illustrating one embodiment of a cable holder that has been used to pull some of the connector plugs away from a receptacle panel. In this example, a user may pull on the left connector removal tab 134 to sequentially withdraw connector plugs 126 from left to right across electrical device 142. As the user pulls on the connector removal tab, the user may also depress release tabs 146 of connector plugs 126 to successively release the connector plugs from engagement with receptacles 140.

Figure 6:
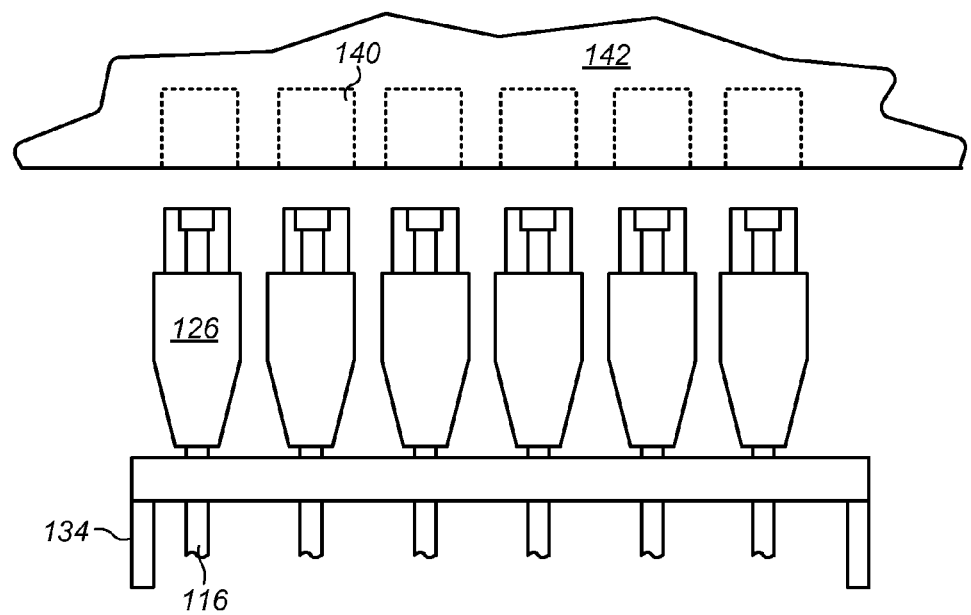
FIG. 6 is a top view illustrating one embodiment of a cable holder on a group of cables that has been removed from a receptacle panel.

FIG. 6 is a top view illustrating one embodiment of a cable holder on a group of cables that has been removed from a receptacle panel of an electrical device. Cable holder 124 may be used to maintain cables 116 in the same order and spatial relationship with one another during service of electrical device 142. In some embodiments, cables 116 are reinstalled in a new or repaired electrical device while cable holder 124 remains in place on cables 116.

Figure 7:
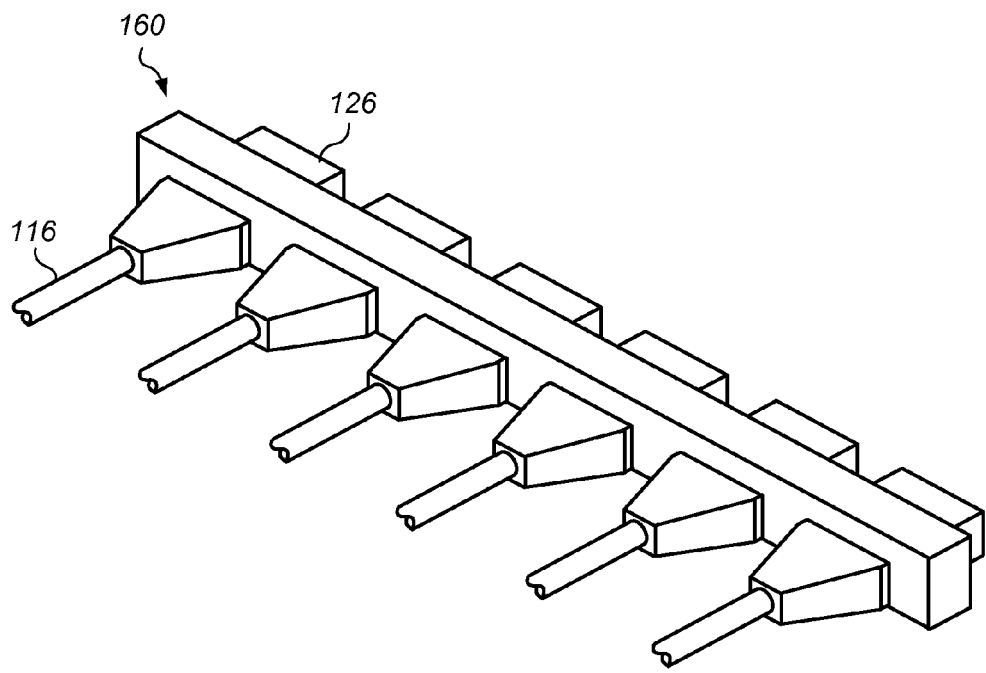
FIG. 7 illustrates one embodiment of a cable holder that holds multiple connector plugs.

In some embodiments, a cable holder carries a group of connector plugs that are to be installed in a corresponding group of receptacles in an electrical device. FIG. 7 illustrates one embodiment of a cable holder that holds multiple connector plugs. Cable holder 160 holds connector plugs 126 of cables 116. In some embodiments, the body of cable holder 160 is relatively rigid. In some cases, connector plugs 126 snap into place in cable holder 160. Cable holder 160 may align and position connector plugs 126 with respect to one another. Cable holder 160 may maintain a spatial order and arrangement of the connector plugs. The order of connector plugs 126 installed on the cable holder may be chosen to match corresponding receptacles on an electrical device.

Figure 8:
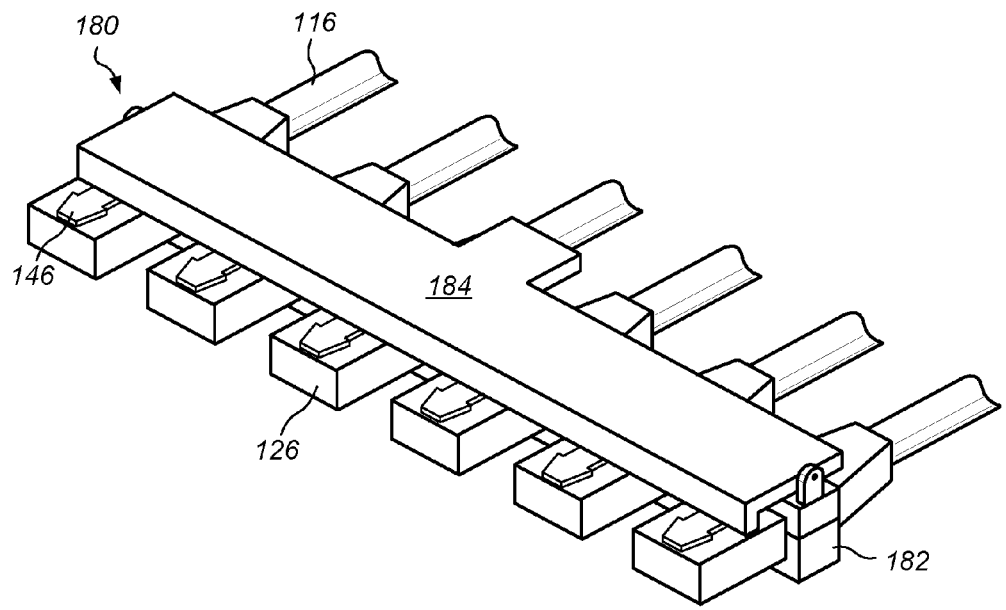
FIG. 8 illustrates one embodiment of a cable holder having a release bar for releasing connector plugs from a set of connector receptacles on a panel of an electrical device.

In some embodiments, a cable holder includes a mechanism for releasing connector plugs from receptacles on a panel of an electrical device. In some embodiments, multiple connector plugs are released by way of a single action by a user (for example, depressing a button or lever). FIG. 8 illustrates one embodiment of a cable holder including a release bar that can be operated to release connector plugs from a set of receptacles on a panel. Cable holder 180 includes cable holder body 182 and release lever 184. Connector holder body 182 holds cables 116 and connector plugs 126. Release lever 184 may be connected to cable holder body 182 by way of hinge 186. The front edge of release lever 182 may contact connector release tabs 146 of connector plugs 126. In some embodiments, release lever 184 is spring-loaded.

Figure 9A:
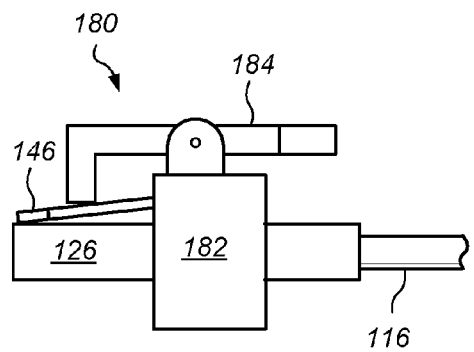
FIGS. 9A and 9B are side views illustrating operation of a release bar of a cable holder that can be operated to release connector plugs from receptacles of an electrical device.
Figure 9B:
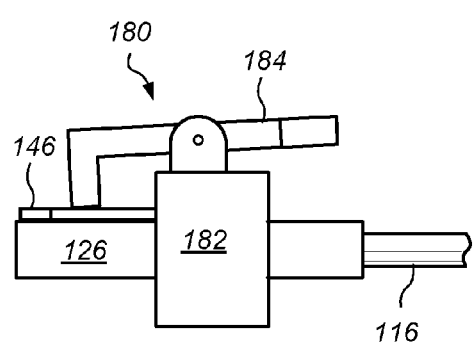

FIGS. 9A and 9B are side views illustrating operation of a release lever of a cable holder to release connector plugs from receptacles of an electrical device. When cables 116 are in their installed condition, release lever 184 may be as shown in FIG. 9A. To release connector plugs 126 from electric device 142, the rear tab on release lever 184 may be lifted up to operate release lever 184. The release lever 184 may depress release tabs 146 of connector plugs 126, as illustrated in FIG. 9B.

In some embodiments, a cable holder includes a release mechanism for multiple rows of connector plugs. FIGS. 10A and 10B are side views illustrating operation of a release bar of a cable holder to release connector plugs from two rows of receptacles of an electrical device. The two rows of receptacles may be, in one example, similar to that shown for network switch 106 in FIG. 1. Cable holder 220 includes cable holder body 222 and connector plug release mechanism 224. Cable holder body 222 holds cables 116 and connector plugs 126. Connector plug release mechanism 224 include upper release lever 226, lower release lever 228, and toggle assembly 230. Upper release lever 226 and lower release lever 228 may be hinged to cable holder body 222, in a manner similar to that described above relative to FIG. 8. In some embodiments, one or more both of the release levers are spring-loaded. When cables 116 are in their installed condition, connector plug release mechanism 224 may be as shown in FIG. 10A. To release connector plugs 126 from connector receptacles of an electric device, toggle assembly 230 may be pushed forward to spread apart the rear ends of release levers 226 and 228. Upper release lever 226 and lower release lever 228 may depress release tabs 146 of connector plugs 126, as illustrated in FIG. 10B.

Cable holders have been shown, for illustrative purposes, as grouping and ordering electrical network connector plugs. Cable holders may nevertheless in some embodiment be used to group other types of cables and connector plugs for connection with a panel. In one embodiment, a cable holder arranges and holds power connector plugs. The connector plugs may be installed in a defined arrangement on a power distribution unit (for example, a rack PDU). In certain embodiments, a cable holder includes a release mechanism for removing power plugs from a set of receptacles, an insertion mechanism for inserting the power plugs into a set of receptacles, or both.

In some embodiments, a cable holder arranges and holds fiber optic cables in a defined arrangement for connection with set of receptacles on the panel of an electrical device. In one embodiment, a cable holder groups a set of two or more SFP connector plugs for connection with receptacles on a network switch.

In the embodiments shown FIGS. 9A, 9B, 10A, and 10B, the release mechanism pushes on a release element a connector. Other arrangements for actuating a release element of a connector may be employed in other embodiments, however. For example, a release mechanism a cable holder may pull on a tab, or depress or lift a release loop of the connector plug.

In one embodiment, a method of managing cable connections to an electrical device includes installing a cable holder on one or more cables in which the spacing and arrangement of the cables matches the spacing and arrangement of connector receptacles on the electrical device. In some embodiments, the electrical device is a network switch.

FIG. 11A illustrates a side view of one embodiment of a cable holder for a set of fiber optic cables. FIG. 11B illustrates a top view of the cable holder shown in FIG. 11A. Cables 260 include connector plugs 262. Cable holder 264 includes holder body 266 and release mechanism 268. Release mechanism 268 includes lever 270. Lever 270 may be moved to engage and operate release loops 272 on connector plugs 262 to facilitate removal of cables 260. In one embodiment, a cable holder carries a set of SFP connector plugs.

FIG. 12A illustrates a front view of one embodiment of a cable holder for a set of power cables installed in a rack power distribution unit. FIG. 12B illustrates a side view of the cable holder shown in FIG. 12A. Cables 280 include connector plugs 282. Connector plugs 282 are installed in rack PDU 284. Cable holder 286 includes holder body 288 and release mechanism 290. Release mechanism 290 includes levers 292 and pins 294. Pins 294 may slide in corresponding holes or sleeves in holder body 288. Levers 292 may be moved to push pins 294 against rack PDU 284 to extract connector plugs 282 from rack PDU 284.

FIG. 13 illustrates one embodiment of managing connections to an electrical device using a cable holder that groups multiple connector plugs. At 300, a cable holder is coupled to one or more cables such that the cable holder maintains two or more portions of the cables in a predetermined spacing and arrangement with respect to one another. The predetermined spacing and arrangement matches a spacing and arrangement on a corresponding set of connector receptacles on an electrical device. In some embodiments, the cable holder maintains connector plugs at the ends of the cables in a predetermined spacing and arrangement.

In some embodiments, cable holders are used to group and order sets of connector plugs to be installed on a front panel of the electrical device. For example, one cable holder may group and order Cables 1-8, which have connector plugs are to be installed in Receptacles 1-8, respectively, a second cable holder may group and order Cables 9-16, which has connector plugs to be installed in Receptacles 9-16, and so on.

At 302, connector plugs are coupled to corresponding connector receptacles on the electrical device while the cable holder is coupled to the cables. In some embodiments, cables are removed from an electrical device while cable holders are attached to the cables. The cable holders may remain in place on the cables to maintain the grouping and ordering of the cables during service or replacement of the electrical device. Once the electrical device has been repaired or replaced, the cables may be reinstalled, group by group, using the cable holders.

In some embodiments, connector plugs grouped on a cable holder are installed and released sequentially from connector receptacles on an electrical device. In other embodiments, connector plugs grouped on a cable holder are installed and released simultaneously.

The various methods as illustrated in the Figures and described herein represent exemplary embodiments of methods. The order of methods may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a plurality of cables comprising a plurality of connector plugs, and
   one or more cable holders coupled to at least a portion of the cables, wherein at least one of the cable holders comprises:
   a connector plug release mechanism configured to operate a release element on each of a first row of cable connector plugs that are coupled with the at least one cable holder when the release mechanism is actuated;
   an additional connector plug release mechanism configured to operate a release element on each cable connector plug of a second row of cable connector plugs coupled with the at least one cable holder when the additional release mechanism is actuated; and
   a toggle assembly configured to concurrently actuate the connector plug release mechanism and the additional connector plug release mechanism.

2. The system of claim 1, further comprising:
   a rack;
   one or more electrical devices coupled to the rack, wherein at least one of the electrical devices comprises:
   an enclosure; and
   a plurality of connector receptacles on the enclosure,
   wherein the at least some of the cables are coupled to the plurality of connector receptacles on the enclosure of the at least one electrical device coupled to the rack.

3. The system of claim 2, wherein the at least one cable holder holds at least two connector plugs in a predetermined spacing and predetermined alignment with respect to one another, wherein the predetermined spacing and predetermined alignment matches spacing and alignment of corresponding connector receptacles on the at least one electrical device.

4. The system of claim 2, wherein the at least one electrical device comprises a console switch or a network switch.

5. The system of claim 2, wherein the one or more cable holders comprises a plurality of cable holders, wherein each of at least two of the cable holders is configured to maintain spacing of a different set of connector plugs coupled to connector receptacles on the at least one electrical device.

6. A cable holder, comprising:
   a connector plug release mechanism configured to operate a release element on each connector plug of a first row of connector plugs coupled with the cable holder when the release mechanism is actuated;
   an additional connector plug release mechanism configured to operate a release element on each connector plug of a second row of connector plugs coupled with the cable holder when the additional release mechanism is actuated; and
   a toggle assembly configured to concurrently actuate the connector plug release mechanism and the additional connector plug release mechanism.

7. The cable holder of claim 6, wherein the cable holder is configured to hold connector plugs from two or more different cables in a predetermined spacing with respect to one another.

8. The cable holder of claim 6, wherein a spacing between at least two of the connector plugs in the cable holder is adjustable by a user.

9. The cable holder of claim 6, further comprising one or more cable holder body members, wherein at least a portion of one or more of the cable holder body members is pliable.

10. The cable holder of claim 6, further comprising at least one cable holding portion configured to couple with a fiber optic connector plug.

11. The cable holder of claim 6, wherein the connector plug release mechanism or the additional connector plug release mechanism is configured to operate release elements of each of at least three connector plugs when the release mechanism is actuated.

12. The cable holder of claim 6, wherein the connector plug release mechanism or the additional connector plug release mechanism is configured to operate a release element on each of at least three fiber optic connector plugs when the release mechanism is actuated.

13. The cable holder of claim 6, further comprising one or more labels on the cable holder that identify one or more of the connector plugs or one or more cables.

14. The cable holder of claim 6, wherein cable holding portions of the cable holder are configured to maintain an order and spacing of three or more connector plugs of the first row and three or more connector plugs of the second row.

15. A method of managing connections to an electrical device, comprising:
  coupling a first row of two or more respective connector plugs of two or more respective cables to a cable holder such that the cable holder maintains the two or more cables in a predetermined spacing and arrangement with respect to one another, wherein the predetermined spacing and arrangement matches a spacing and arrangement on a corresponding set of two or more connector receptacles on a particular electrical device;
  coupling a second row of two or more respective connector plugs of two or more respective cables to the cable holder such that the cable holder maintains the two or more cables in a predetermined spacing and arrangement with respect to one another, wherein the predetermined spacing and arrangement matches a spacing and arrangement on a corresponding set of two or more connector receptacles on the particular electrical device or another particular electrical device;
  operating a toggle assembly into a first position to concurrently actuate a connector plug release mechanism of the cable holder associated with the first row of connector plugs and a connector plug release mechanism of the cable holder associated with the second row of connector plugs to disconnect the cables from the particular electrical device or the other particular electrical device; and
  operating the toggle assembly into a second position to concurrently actuate the connector plug release mechanism associated with the first row and the connector plug release mechanism associated with the second row to couple the respective connector plugs of the three or more cables to corresponding connector receptacles on the particular electrical device, the other particular electrical device or another electrical device.

16. The method of claim 15, further comprising:
  replacing the particular electrical device with a replacement electrical device;
  wherein said operating the toggle assembly into the second position to couple the respective connector plugs comprises coupling the connector plugs in corresponding connector receptacles on the replacement electrical device.

17. The method of claim 15, wherein said operating the toggle assembly into the first position to disconnect the cables comprises simultaneously removing at least three connector plugs from the particular electrical device or the other particular electrical device.

* * * * *